(12) United States Patent
Bae et al.

(10) Patent No.: US 10,551,927 B2
(45) Date of Patent: Feb. 4, 2020

(54) FORCE REFLECTING SYSTEM

(71) Applicants: UNIST (ULSAN NATIONAL INSTITUTE OF SCIENCE AND TECHNOLOGY), Ulsan (KR); CENTER OF HUMAN-CENTERED INTERACTION FOR COEXISTENCE, Seoul (KR)

(72) Inventors: Joon Bum Bae, Ulsan (KR); Jeong Soo Lee, Ulsan (KR); In Seong Jo, Ulsan (KR); Yeon Gyu Park, Ulsan (KR); Bum Jae You, Seoul (KR)

(73) Assignees: UNIST (ULSAN NATIONAL INSTITUTE OF SCIENCE AND TECHNOLOGY), Ulsan (KR); CENTER OF HUMAN-CENTERED INTERACTION FOR COEXISTENCE, Seoul (KR)

(*) Notice: Subject to any disclaimer, the term of this patent is extended or adjusted under 35 U.S.C. 154(b) by 0 days.

(21) Appl. No.: 16/309,484

(22) PCT Filed: Jun. 13, 2017

(86) PCT No.: PCT/KR2017/006133
§ 371 (c)(1),
(2) Date: Dec. 13, 2018

(87) PCT Pub. No.: WO2017/217732
PCT Pub. Date: Dec. 21, 2017

(65) Prior Publication Data
US 2019/0332172 A1    Oct. 31, 2019

(30) Foreign Application Priority Data
Jun. 14, 2016 (KR) .................. 10-2016-0073845

(51) Int. Cl.
*G08B 6/00* (2006.01)
*G06F 3/01* (2006.01)

(52) U.S. Cl.
CPC .............. *G06F 3/016* (2013.01); *G06F 3/014* (2013.01)

(58) Field of Classification Search
CPC ............ G06F 3/016; G06F 3/014; G09G 5/00
(Continued)

(56) References Cited

U.S. PATENT DOCUMENTS

| 6,042,555 | A * | 3/2000 | Kramer ............. A61B 5/225 600/595 |
| 9,983,669 | B2 * | 5/2018 | Luo .................... G06F 3/014 |
| 2016/0259417 | A1 * | 9/2016 | Gu ..................... G06F 3/016 |

FOREIGN PATENT DOCUMENTS

| JP | 2003-316493 A | 11/2003 |
| JP | 2004-009188 A | 1/2004 |

(Continued)

*Primary Examiner* — Tai T Nguyen
(74) *Attorney, Agent, or Firm* — Novick, Kim & Lee, PLLC; Sang Ho Lee

(57) ABSTRACT

Provided is a force conveyance system that is configured to have 6 degrees of freedom, thereby allowing freedom of movement such as opening/closing of a hand and adduction/abduction of a finger and reflecting a desired force to a fingertip without obstructing the movement of a finger. Also, the force conveyance system may estimate a fingertip position and a finger joint angle, measure a finger movement, and convey a more accurate force accordingly.

14 Claims, 12 Drawing Sheets

(58) Field of Classification Search
USPC .................................. 340/407.2; 414/5, 730
See application file for complete search history.

(56) References Cited

FOREIGN PATENT DOCUMENTS

| KR | 10-2001-0028461 A | 4/2001 |
| KR | 10-2014-0001434 A | 1/2014 |
| KR | 10-2014-0131175 A | 11/2014 |
| KR | 10-1485414 B1 | 1/2015 |

* cited by examiner (a)

(b)                    (c)

(a)

(b)

(a)

(b)

(c)

FORCE REFLECTING SYSTEM

TECHNICAL FIELD

The present disclosure relates to a force conveyance system, and more particularly, to a force conveyance system that may effectively convey to a finger a force felt when a virtual object is touched with a hand.

BACKGROUND ART

A force conveyance system is a system for interacting with a virtual object by conveying a force generated by the virtual object in virtual reality to a finger. In the force conveyance system, it may be necessary to accurately convey the force generated by the virtual object to a hand of a user while allowing a natural movement of the hand.

When a force conveyance system of the related art uses pneumatic pressure, it is configured to adjust the length of a piston to convey a force to a user. In this case, since the piston is connected to a finger by a rotational joint, the direction of a force acting on a finger is not perpendicular to a hand, and thus there is a limitation in that it is different from the direction of a force actually conveyed by a virtual object. In addition, there is a limitation in that the movement range of the hand is restricted due to the length of the piston.

Meanwhile, in the case of a force conveyance system which conveys a force to a hand through use of an external robot, since it is not in a form to be worn on the hand, a user may not freely move his/her arm and the mobility of the user is restricted due to its large size.

Related Art Document: Korean Patent No. 10-1485414

DESCRIPTION OF EMBODIMENTS

Technical Problem

Provided is a force conveyance system that may convey a more accurate force to a finger while allowing free movement of a hand.

Solution to Problem

According to an aspect of the present disclosure, a force conveyance system includes: a hand-back-wearable unit worn on the back of a hand; an active unit provided in the hand-back-wearable unit to generate a rotational force; an active link rotatably coupled to the active unit and rotatable by the rotational force; a passive link coupled to the active link by a first coupler to have 2 degrees of freedom; a finger-wearable unit coupled to the passive link by a second coupler to have 3 degrees of freedom and worn on the tip of a finger; and a controller which estimates a position of the fingertip and an angle of a finger joint and controls the rotational force of the active unit according to the estimation.

According to another aspect of the present disclosure, a force conveyance system includes: a hand-back-wearable unit worn on the back of a hand; an active unit provided in the hand-back-wearable unit to generate a rotational force; an active link rotatably coupled to the active unit and rotatable by the rotational force; a passive link coupled to the active link by a first coupler to have 2 degrees of freedom; a finger-wearable unit coupled to the passive link by a second coupler to have 3 degrees of freedom and worn on the tip of a finger; an active unit sensor which measures a rotation angle of the active unit; a first hole sensor provided at one end of the first coupler to measure a rotation angle of the active link; a second hole sensor provided at another end of the first coupler to measure a rotation angle of the passive link; and a controller which calculates a tip position of the finger according to the rotation angle of the active unit measured by the active unit sensor, the rotation angle of the active link measured by the first hole sensor, and the rotation angle of the passive link measured by the second hole sensor; calculates an angle of the finger joint by using the tip position of the finger; and controls the rotational force of the active unit according to the angle of the finger joint, wherein the first coupler includes one end coupled to the active link and coupled to be rotatable by the rotational force of the active unit around a first rotational axis arranged in an adduction/abduction direction of the finger and another end coupled to the passive link and coupled to be rotatable by the movement of the finger around a second rotational axis arranged in a direction perpendicular to the back of the hand, and the second coupler includes a first rotation unit coupled to the finger-wearable unit and coupled to be rotatable by the movement of the finger around a third rotational axis arranged in an adduction/abduction direction of the finger, a second rotation unit protruding upward from the first rotation unit and coupled to be rotatable by the movement of the finger around a fourth rotational axis arranged in a lengthwise direction of the finger, and a third rotation unit configured to couple the second rotation unit and the passive link and coupled to be rotatable by the movement of the finger around a fifth rotational axis arranged in a lengthwise direction of the passive link.

Advantageous Effects of Disclosure

Since the force conveyance system according to the present disclosure is configured to have 6 degrees of freedom, the force conveyance system may allow freedom of movements such as opening/closing of the hand and adduction/abduction of the finger and convey a desired force to the fingertip without obstructing the movement of the finger.

Also, the force conveyance system may estimate a fingertip position and a finger joint angle, measure a finger movement, and convey a more accurate force accordingly.

BEST MODE

Hereinafter, embodiments of the present disclosure will be described with reference to the accompanying drawings.

Figure 1:
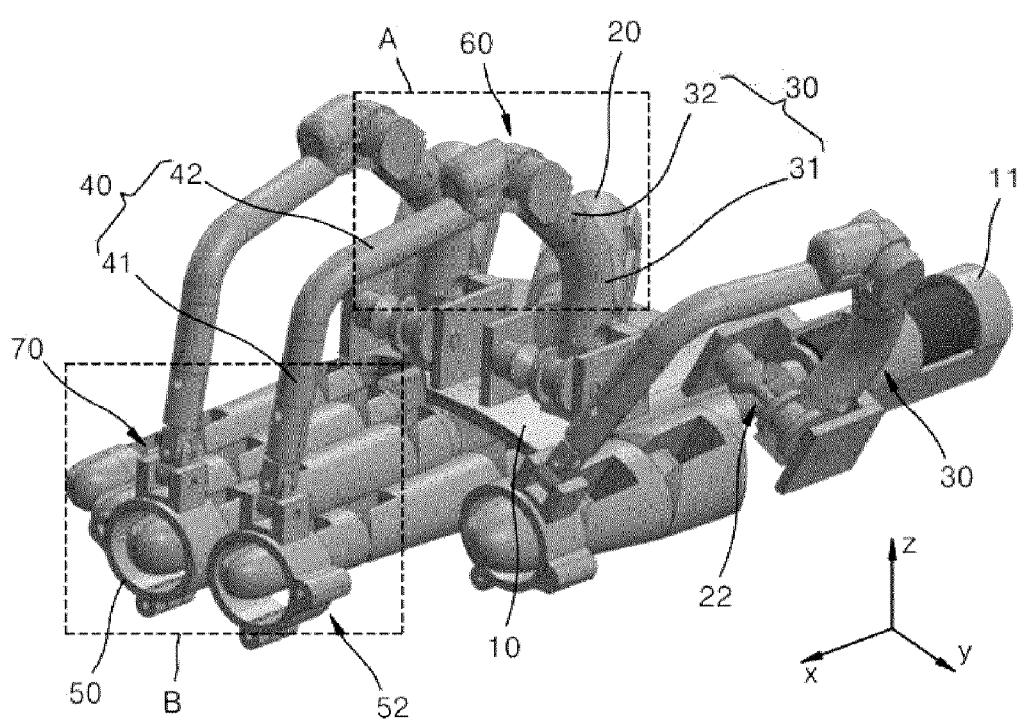
FIG. 1 is a diagram illustrating a force conveyance system according to an embodiment of the present disclosure.
Figure 2:
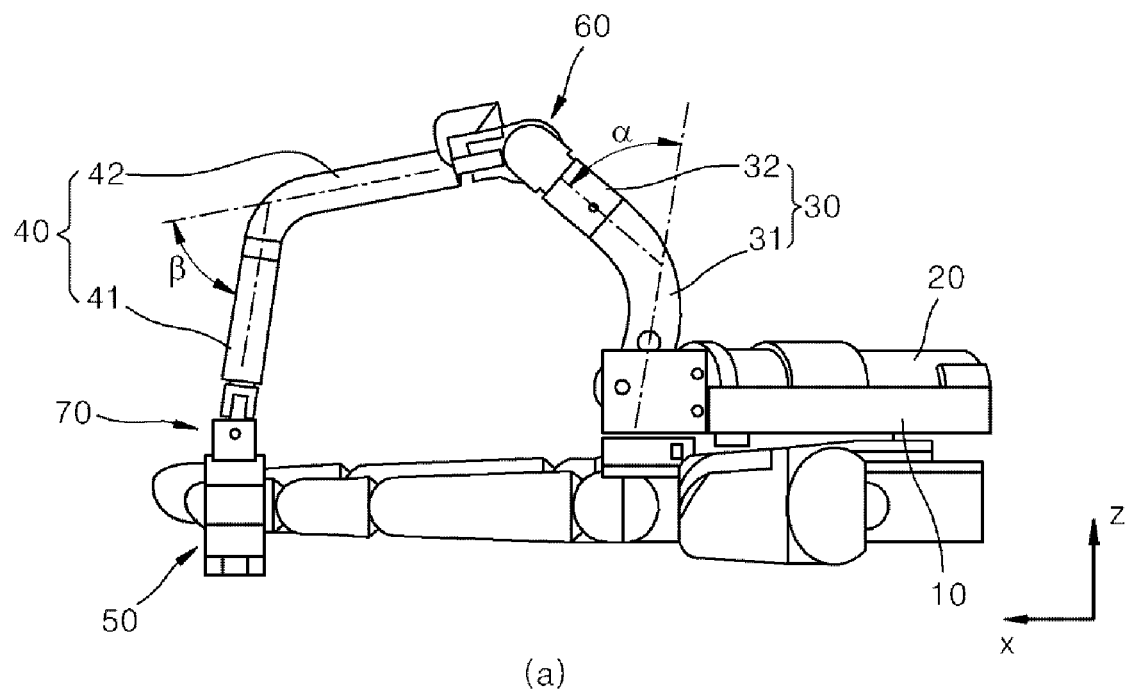
FIG. 2 is a diagram illustrating the shapes of an active link and a passive link, according to an embodiment of the present disclosure.
Figure 2:
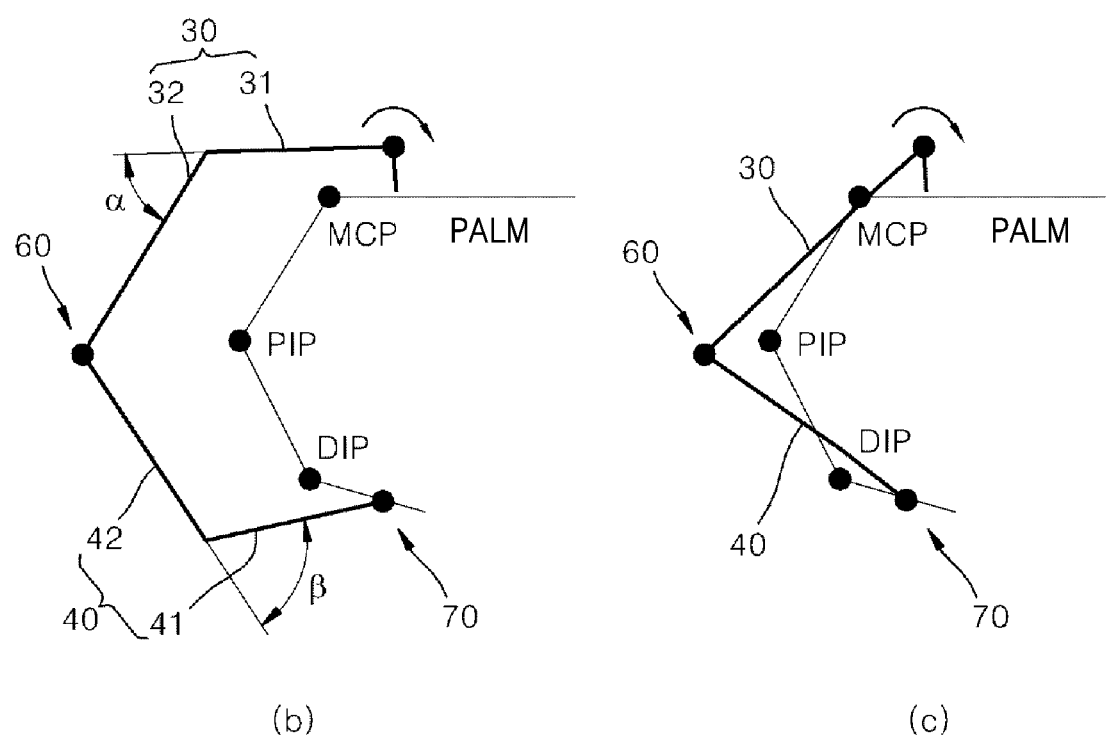

FIG. 1 is a diagram illustrating a force conveyance system according to an embodiment of the present disclosure. FIG. 2 is a diagram illustrating the shape of an active link and a passive link according to an embodiment of the present disclosure.

Referring to FIG. 1, a force conveyance system according to an embodiment of the present disclosure may be a system for interacting with a virtual object by conveying a force generated by the virtual object to a fingertip of a user. Also, the force conveyance system may be used in the field of rehabilitation medical treatment. Herein, the user may be a robot as well as a person. Hereinafter, in the present embodiment, the force conveyance system is illustrated as being worn on the hand of a robot; however, it may also be worn on the hand of a person as well.

As an example, the force conveyance system will be described as conveying a force to three fingers such as a thumb, an index finger, and a middle finger.

The force conveyance system may include a hand-back-wearable unit 10, an active unit 20, an active link 30, a passive link 40, a finger-wearable unit 50, a first coupler 60, a second coupler 70, an active unit sensor (not illustrated), first and second hole sensors (not illustrated), and a controller (not illustrated).

The hand-back-wearable unit 10 may be formed to be worn on the back of the hand of the user. The hand-back-wearable unit 10 may be formed to cover at least a portion of the hand back. The hand-back-wearable unit 10 may be worn on the wrist of the user in addition to the hand back of the user.

The active unit 20 may be installed on the hand-back-wearable unit 10. The active unit 20 may be detachably coupled to an active unit holder 11 provided at the hand-back-wearable unit 10.

As an example, the active unit 20 may include a rotary motor.

The active unit 20 may be arranged long in a direction inclined at a preset angle with respect to a lengthwise direction x of the finger. Herein, the preset angle may be, for example, about 45 degrees. Since the active unit 20 is arranged to be inclined at an angle of 45 degrees with respect to the lengthwise direction x of the finger, the area occupied by the active unit 20 on the hand-back-wearable unit 10 when a plurality of active units 20 are mounted may be minimized and thus the force conveyance system may be miniaturized.

The active link 30 may be rotatably coupled to the active unit 20 and may be rotated by the rotational force of the active unit 20. The active link 30 and the active unit 20 may be coupled by an active joint. In the present embodiment, since the active unit 20 and the active link 30 may be arranged to be inclined at 45 degrees with respect to the lengthwise direction x of the finger, a rotation axis of the active unit 20 and a sixth rotation axis 86 of the active link 30 may be coupled, for example, by a bevel gear 22. However, the present disclosure is not limited thereto, and the active link 30 and the active unit 20 may be coupled by a single rotation axis.

Referring to FIG. 2, the active link 30 may include a first active link unit 31 and a second active link unit 32 that are integrally formed.

The first active link unit 31 may be coupled to the active unit 20 and may be formed long upward from the hand-back-wearable unit 10. An end portion of the first active link unit 31 may be coupled to the active unit 20 by the sixth rotation axis 86. The sixth rotation axis 86 of the first active link unit 31 and the rotation axis of the active unit 20 may be coupled by the bevel gear 22. The first active link unit 31 may be rotated by the rotational force of the active unit 20.

The second active link unit 32 may be formed to extend from the first active link unit 31. The second active link unit 32 may be inclined upward and may be inclined at a first preset angle α from the first active link unit 31. An end portion of the second active link unit 32 may be coupled to the first coupler 60. The first preset angle α may be set differently according to the length of the first active link unit 31 and the second active link unit 32 or the length of the finger.

The passive link 40 may be moved by the rotational force transmitted from the active link 30 or may be moved according to the movement of the finger.

Referring to FIG. 2, the passive link 40 may include a first passive link unit 41 and a second passive link unit 42 that are integrally formed.

The first passive link unit 41 may be coupled to the second coupler 70 and may be formed long upward from the second coupler 70. The first passive link unit 41 and the second coupler 70 may be coupled by a passive joint.

The second passive link unit 42 may be formed to extend from the first passive link unit 41. The second passive link unit 42 may be inclined upward and may be inclined at a second preset angle β from the first passive link unit 41. An end portion of the second passive link unit 42 may be coupled to the first coupler 60. The second passive link unit 42 and the first coupler 60 may be coupled by a passive joint. The second preset angle β may be set differently according to the length of the first passive link unit 41 and the second passive link unit 42 or the length of the finger.

Referring to FIG. 2B, the first active link unit 31 and the second active link unit 32 may be formed to form the first preset angle α and the first passive link unit 41 and the second passive link unit 42 may be formed to have the second preset angle β such that the active link 30 and the passive link 40 may not touch the finger during the bending operation of the finger.

Meanwhile, in comparison with FIG. 2B, referring to FIG. 2C, when the active link 30 and the passive link 40 are formed in a straight line shape, the active link 30 and the passive link 40 may touch the finger during the bending operation of the finger and thus the movement of the finger may be restricted.

The finger-wearable unit 50 may include a finger holder 51, an opening/closing member 52, and an elastic member 53.

The finger holder 51 may be formed in a ring shape to be fitted to the tip of the finger and may have an opening portion 51a having one side open. However, the present disclosure is not limited thereto, and the finger holder 51 may formed in any shape that may be fitted to the tip of the finger.

Figure 7:
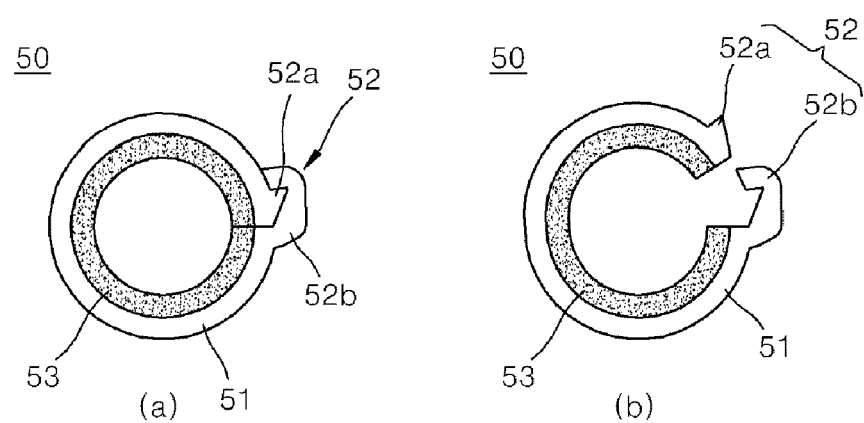
FIG. 7 is a diagram illustrating an opening/closing member of a finger-wearable unit according to an embodiment of the present disclosure.

Referring to FIG. 7, the opening/closing member 52 may include a protrusion portion 52a formed at one end of the finger holder 51 and a hook portion 52b detachably coupled to the protrusion portion 52a.

The elastic member 53 may be provided at the inner circumferential surface of the finger holder 51 to improve the wearability thereof. As an example, the elastic member 53 may include silicon.

Figure 3:
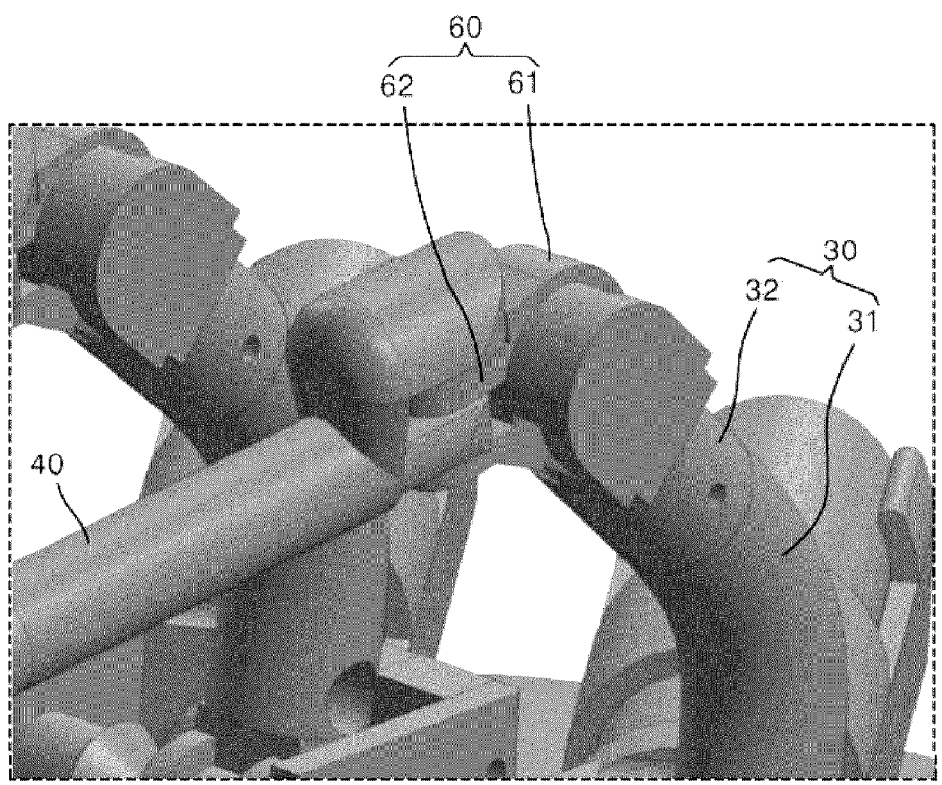
FIG. 3 is an enlarged view of portion A in FIG. 1.
Figure 4:
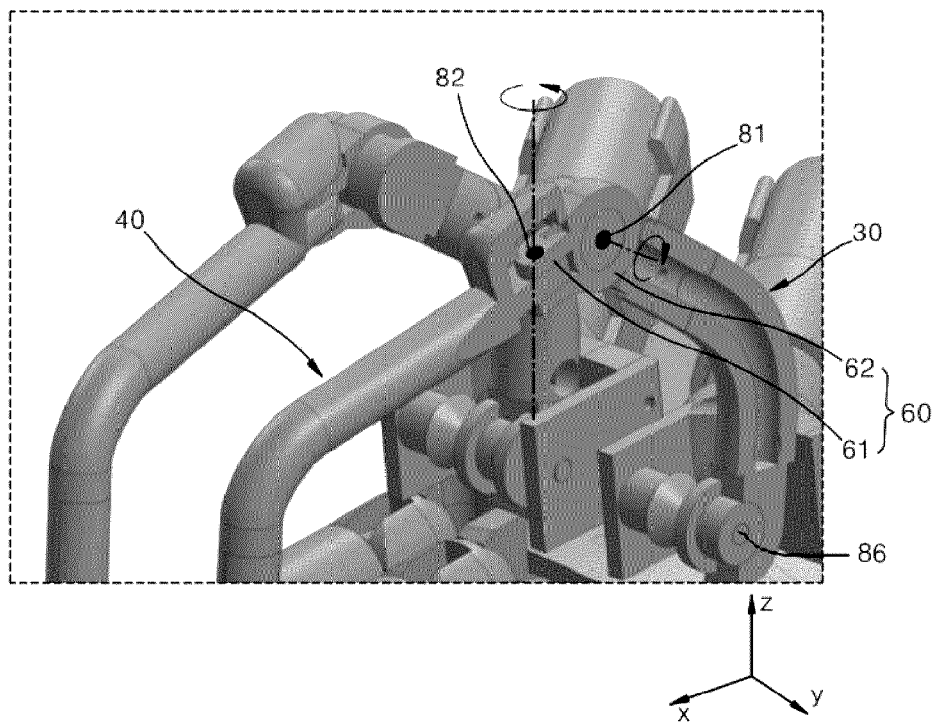
FIG. 4 is a cutaway perspective view illustrating the coupling structure of an active link and a passive link in FIG. 3.

FIG. 3 is an enlarged view of portion A in FIG. 1. FIG. 4 is a cutaway perspective view illustrating the coupling structure of an active link and a passive link in FIG. 3.

Referring to FIGS. 3 and 4, one end of the first coupler 60 may be coupled to the active link 30 and the other end thereof may be coupled to the passive link 40. That is, the first coupler 60 may be provided between the active link 30 and the passive link 40 such that the passive link 40 may have 2 degrees of freedom from the active link 30.

One end 61 of the first coupler 60 may be coupled to the active link 30 and may be coupled to be rotated by the rotational force of the active unit 20 around a first rotation axis 81 arranged in a movement direction of the finger. Herein, the movement direction of the finger may be described as being arranged long in an adduction/abduction direction y of the finger. The one end 61 of the first coupler 60 may be formed in a cylindrical bush shape to be coupled to the active link 30 by the first rotation axis 81.

The other end 62 of the first coupler 60 may be coupled to the passive link 40 and may be provided to be rotated around a second rotation axis 82 by the movement of the finger. The second rotation axis 82 may be arranged in a direction inclined at a certain angle with respect to a direction z perpendicular to the back of the hand. However, assuming that the certain angle is very small, the second rotation axis 82 may be described as being arranged long in the direction z perpendicular to the back of the hand.

Figure 5:
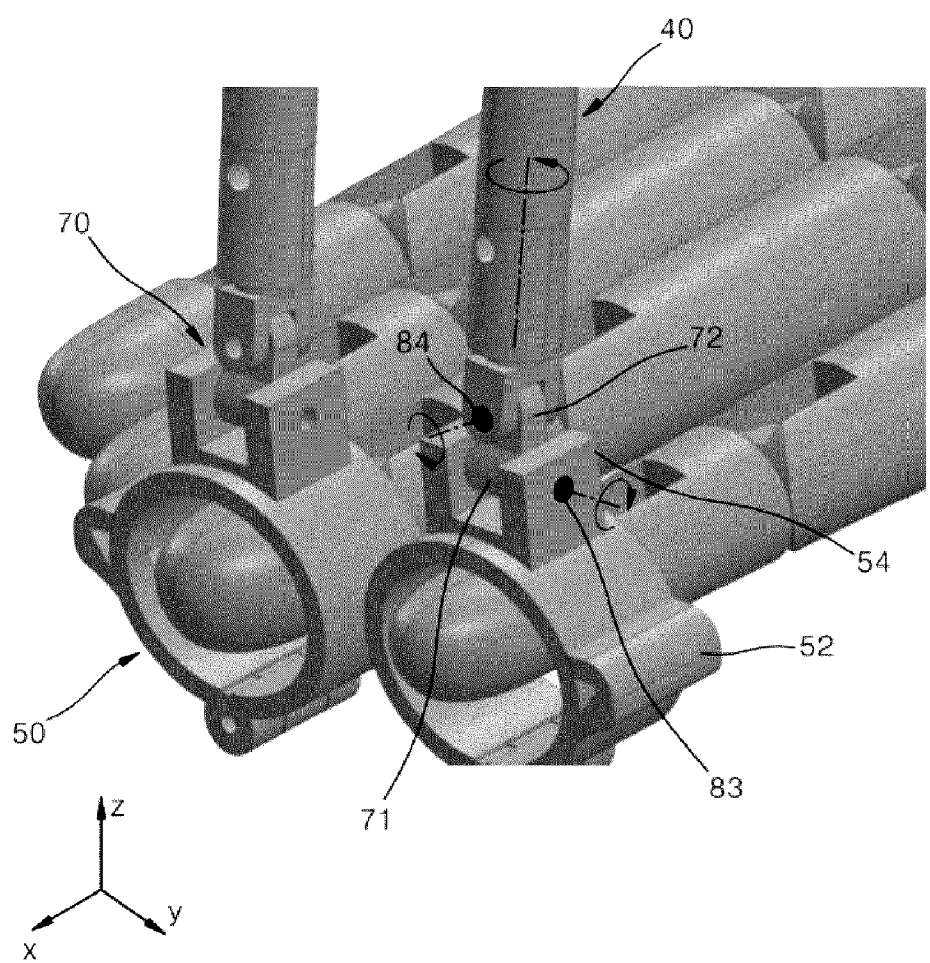
FIG. 5 is an enlarged view of portion B in FIG. 1.
Figure 6:
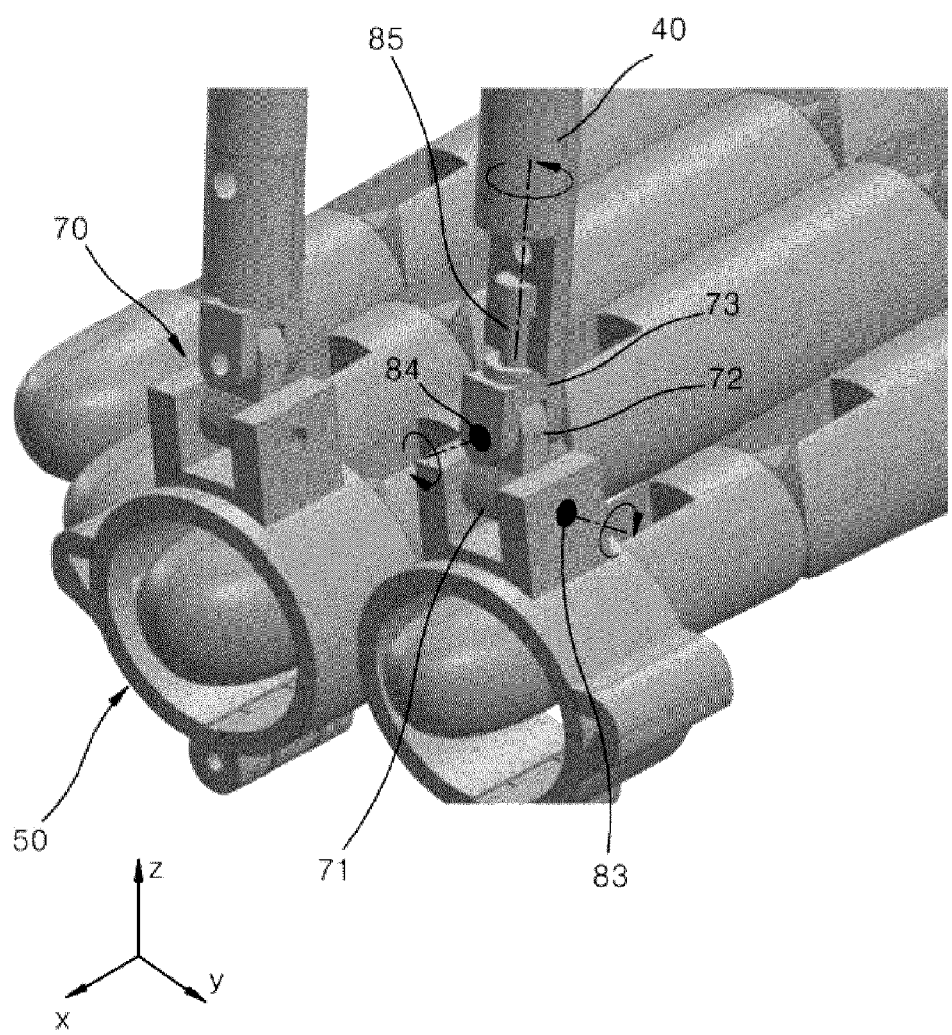
FIG. 6 is a cutaway perspective view illustrating the coupling structure of a passive link and a finger-wearable unit in FIG. 5.

FIG. 5 is an enlarged view of portion B in FIG. 1. FIG. 6 is a cutaway perspective view illustrating the coupling structure of a passive link and a finger-wearable unit in FIG. 5.

Referring to FIGS. 5 and 6, the second coupler 70 may include a first rotation unit 71, a second rotation unit 72, and a third rotation unit 73 to have 3 degrees of freedom. The first rotation unit 71, the second rotation unit 72, and the third rotation unit 73 may be integrally formed or may be separately manufactured and then fixedly coupled.

The first rotation unit 71 may be coupled to the finger-wearable unit 50. That is, the first rotation unit 71 may be formed in a cylindrical shape and may be coupled by a third rotation axis 83 between a pair of brackets 54 protruding upward from the finger-wearable unit 50. The third rotation axis 83 may be arranged long in the adduction/abduction direction y of the finger. Thus, the first rotation unit 71 may be rotated around the third rotation axis 83 by the movement of the finger.

The second rotation unit 72 may be formed to protrude upward from the first rotation unit 71. The second rotation unit 72 may be coupled to the third rotation unit 73 by a fourth rotation axis 84. The fourth rotation axis 84 may be arranged in a direction inclined at a certain angle with respect to the lengthwise direction x of the finger. However, assuming that the certain angle is very small, the fourth rotation axis 84 may be described as being arranged long in the lengthwise direction x of the finger. Thus, the second rotation unit 72 may be rotated around the fourth rotation axis 84 by the movement of the finger.

The third rotation unit 73 may be configured to couple the second rotation unit 72 and the passive link 40. One end of the third rotation unit 73 may be coupled to the second rotation unit 72 by the fourth rotation axis 84 and the other end thereof may be coupled to the passive link 40 by a fifth rotation axis 85. The fifth rotation axis 85 may be arranged in the lengthwise direction of the passive link 40. In the present embodiment, since the lengthwise direction of the passive link 40 may be the direction z perpendicular to the back of the hand, the fifth rotation axis 85 may be the direction z perpendicular to the back of the hand.

The active unit sensor (not illustrated) may be a motor encoder for measuring the rotation angle of the active unit 20. It may be assumed that the rotation angle of the active unit 20 may be equal to a rotation angle $\theta 1$ of the first active link unit 31 due to the rotation force of the active unit 20. When the difference between the rotation angle of the active unit 20 and the rotation angle $\theta 1$ of the first active link unit 31 is great, the rotation angle $\theta 1$ of the first active link unit 31 may be obtained from the rotation angle of the active unit 20.

The first hole sensor (not illustrated) may be provided at one end of the first coupler 60 to measure a rotation angle $\theta 2$ of the second active link unit 32.

The second hole sensor (not illustrated) may be provided at the other end of the first coupler 60 to measure a rotation angle $\theta 3$ of the second passive link unit 42.

Also, sensors for measuring a joint angle of the finger may be provided for accurate measurement of a finger movement, and the sensors may be provided at one end or the other end of the first coupler 60 or the second coupler 70.

The operation of the force conveyance system according to an embodiment of the present disclosure will be described below.

When the rotational force of the active unit 20 is determined under the control of the controller (not illustrated), the rotational force of the active unit 20 is transmitted to the finger through the active link 30 and the passive link 40.

In this case, the controller (not illustrated) may estimate the position of the fingertip and the joint angle of the finger and adjust the rotational force of the active unit 20 accordingly. The rotational force of the active unit 20 may be adjusted to adjust the force applied to the fingertip.

Figure 8:
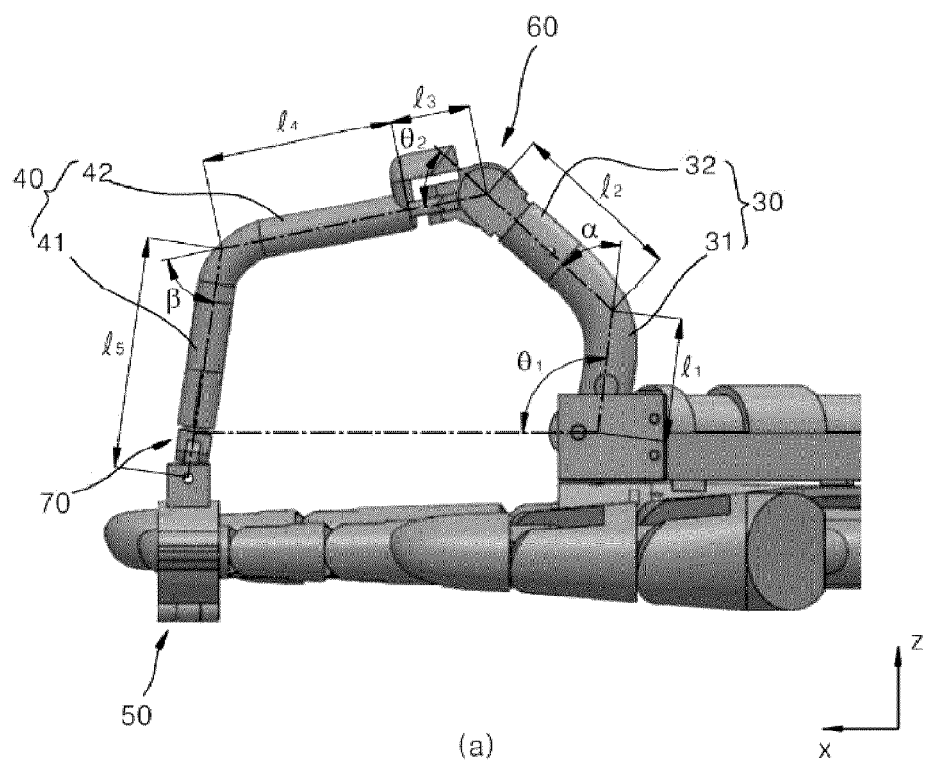
FIG. 8 is a diagram illustrating variables for obtaining the tip position of a finger in a force conveyance system according to an embodiment of the present disclosure.
Figure 8:
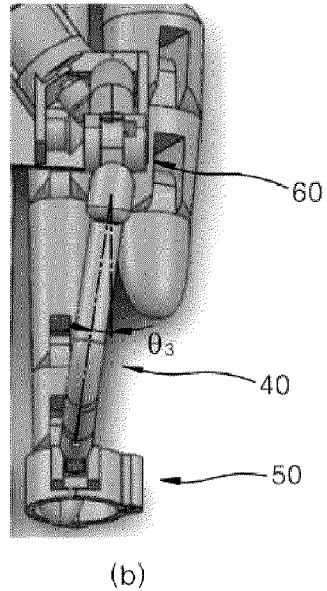
Figure 9:
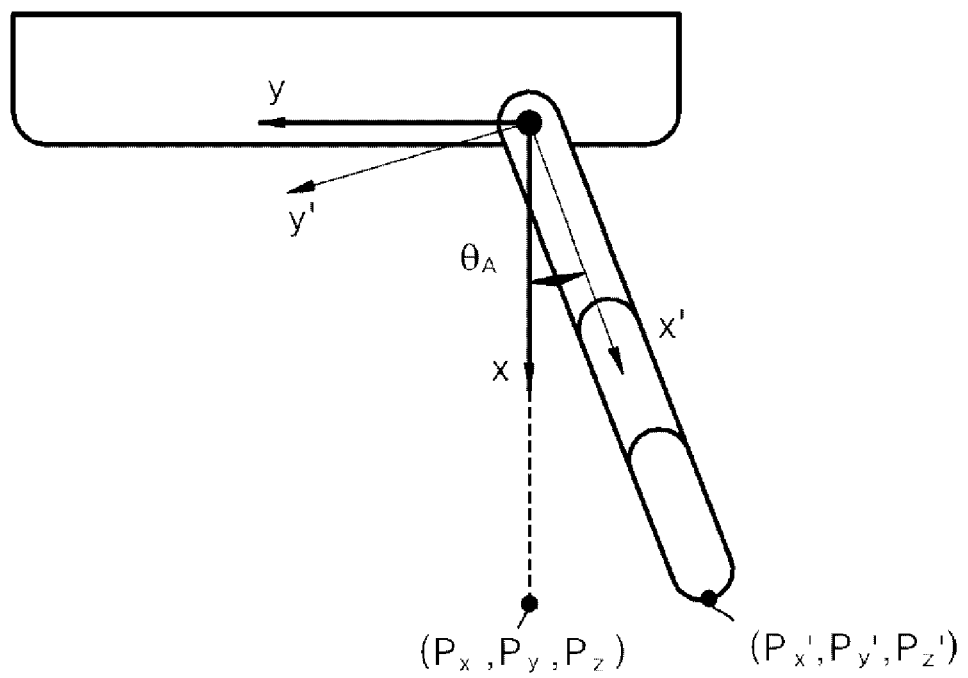
FIG. 9 is a diagram illustrating a model for obtaining the adduction/abduction angle of a finger in a force conveyance system according to an embodiment of the present disclosure.

FIG. 8 is a diagram illustrating variables for obtaining the tip position of a finger in a force conveyance system according to an embodiment of the present disclosure. FIG. 9 is a diagram illustrating a model for obtaining the adduction/abduction angle of a finger in a force conveyance system according to an embodiment of the present disclosure.

Referring to FIG. 8, a method of estimating the position of the finger tip may be as follows.

l1 denotes the length of the first active link unit 31, l2 denotes the length of the second active link unit 32, l3 denotes the length of the first coupler 60, l4 denotes the length of the second passive link unit 42, and l5 denotes the length of the first passive link unit 41. l1 to l5 may be values that may be obtained in advance from the structure information of the force conveyance system.

$\theta 1$ is the rotation angle of the active unit 20, $\theta 2$ is the rotation angle of the second active link unit 32, and $\theta 3$ is the rotation angle of the second passive link unit 42. $\theta 1$ to $\theta 3$ may be values that may be measured from the active unit sensor and the first and second hole sensors (not illustrated).

$\alpha$ denotes an angle between the first passive link unit 31 and the second passive link unit 32, and $\beta$ denotes an angle between the first passive link unit 41 and the second passive link unit 42. α and β may be values that may be obtained in advance from the structure information of the force conveyance system.

Equations 1 to 3 may be obtained by using the kinematic model illustrated in FIG. 8, and a fingertip position (Px, Py, Pz) may be obtained through Equations 1 to 3.

In this case, assuming that an error due to the distance between the fingertip position and the position of the finger-wearable unit 50 is very small, it is assumed that the fingertip position and the position of the finger-wearable unit 50 are equal to each other.

$$Px = l_1 \cos\theta_1 + l_2 \cos(\alpha+\theta_1) + l_3 \cos(\alpha+\theta_1+\theta_2) + l_4 \cos(\alpha+\theta_1+\theta_2)\cos\theta_3 + l_5(-\sin\beta\sin(\alpha+\theta_1+\theta_2) + \cos\beta\cos(\alpha+\theta_1+\theta_2)\cos\theta_3)$$ Equation 1

$$Py = -(l_4 + l_5 \cos\beta)\sin\theta_3$$ Equation 2

$$Pz = l_1 \sin\theta_1 + l_2 \sin(\alpha+\theta_1) + l_3 \sin(\alpha+\theta_1+\theta_2) + l_4 \sin(\alpha+\theta_1+\theta_2)\cos\theta_3 + l_5(\sin\beta\cos(\alpha+\theta_1+\theta_2) + \cos\beta\sin(\alpha+\theta_1+\theta_2)\cos\theta_3)$$ Equation 3

The fingertip position (Px, Py, Pz) may be obtained with reference to Equations 1 to 3.

Meanwhile, when the fingertip position is known, an adduction/abduction angle θA of the finger may be obtained through Equation 2.

Referring to FIG. 9, the adduction/abduction angle θA of the finger may be an angle at which the finger is moved in the horizontal direction. FIG. 9 represents the fingertip position by a frame rotated according to the adduction/abduction angle θA.

The adduction/abduction angle θA may be represented as Equation 4.

$$\theta_A = \sin^{-1}\left(\frac{Py}{-(l_4 + l_5 \cos\beta)}\right)$$ Equation 4

The tip position of the finger rotating may be obtained according to the adduction/abduction angle obtained from Equation 4. Hereinafter, the tip position of the finger rotating according to the adduction/abduction angle will be referred to as a fingertip rotation position (Px', Py', Pz') of the finger.

The fingertip rotation position (Px', Py', Pz') may be represented as Equation 5.

$$\begin{bmatrix} Px' \\ Py' \\ Pz' \end{bmatrix} = \begin{bmatrix} \cos\theta_A & \sin\theta_A & 0 \\ -\sin\theta_A & \cos\theta_A & 0 \\ 0 & 0 & 1 \end{bmatrix} \begin{bmatrix} Px \\ Py \\ Pz \end{bmatrix}$$ Equation 5

When the fingertip rotation position (Px', Py', Pz') is known, the finger joint angle may be obtained through the following equations.

Figure 10:
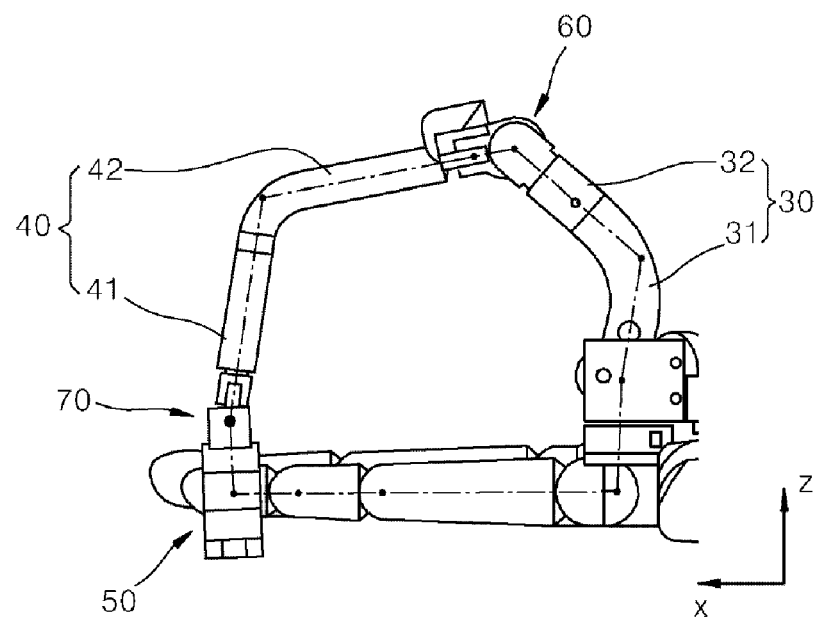
FIG. 10 is a diagram illustrating a kinematic model for obtaining a finger joint angle in a force conveyance system according to an embodiment of the present disclosure.
Figure 10:
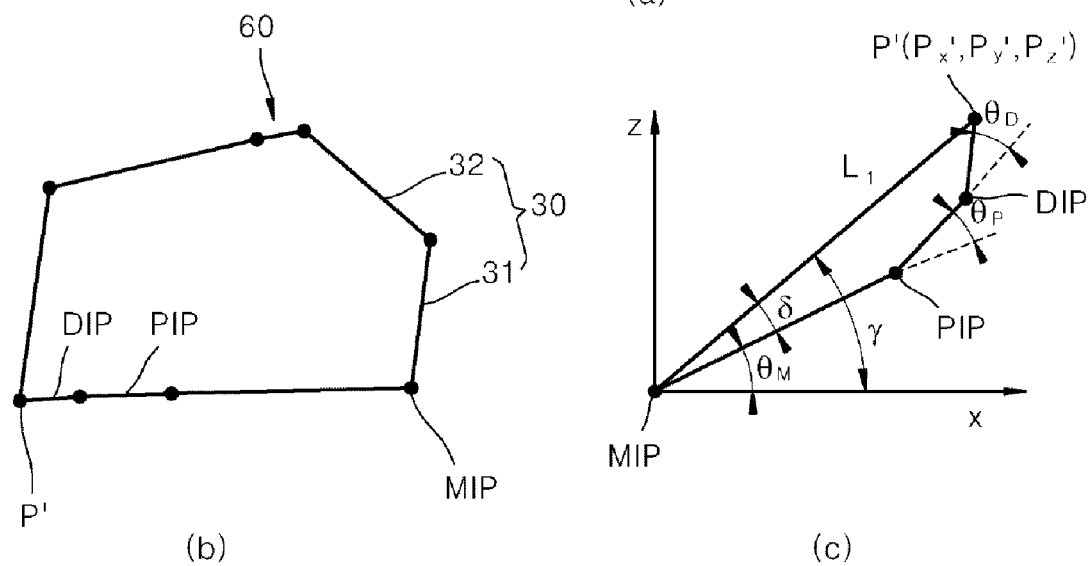

FIG. 10 is a diagram illustrating a kinematic model for obtaining a finger joint angle in a force conveyance system according to an embodiment of the present disclosure.

FIG. 10A illustrates a state in which the finger is opened, and FIG. 10B illustrates the finger-opened state in a kinematic model.

In FIG. 10B, assuming that the length of the finger is 10f, the length ratio of each node may be represented as 2.5f, 2.5f, and 5f. Also, for representation as the kinematic model, it is assumed that the distance between the end portion of the first active link unit 31 and the metacarpophalangeal joint (MCP) of the finger may be negligible because it is similar to the distance between the end portion of the first passive link unit 41 and the finger tip.

Meanwhile, FIG. 10C illustrates the angle of the finger joint on an x'-z' plane when the finger is bent.

In FIG. 10C, θM is the angle of a metacarpophalangeal joint (MCP). θP is the angle of a proximal interphalangeal joint (PIP). θD is the angle of a distal interphalangeal joint (DIP).

Herein, it is assumed that θP and θD are equal to each other. That is, it is assumed that θP and θD are equal to each other because the difference between the angle θP of the proximal interphalangeal joint and the angle θD of the distal interphalangeal joint is within an error range.

Since the fingertip rotation position (Px', Py', Pz') is known, the length of L1 may be represented as Equation 6 from FIG. 10C.

$$L_1 = \sqrt{(Px')^2 + (Pz')^2}$$ Equation 6

Also, θP, θD, and θM, which are the joint angles of the finger, may be obtained by using the kinematic models of Equation 6 and FIG. 10C.

Equations for θP, θD, and θM may be represented as Equations 7 and 8.

$$\theta_D = \theta_P = 2\cos^{-1}\sqrt{\frac{2.5 + \sqrt{-1.75 + 0.32\frac{L_1^2}{f^2}}}{8}}$$ Equation 7

$$\theta_M = \cos^{-1}\frac{Px'}{L_1} - \cos^{-1}\frac{25f^2 + L_1^2 - \left(5f\cos\frac{\theta_P}{2}\right)^2}{10fL_1}$$ Equation 8

As above, when a fingertip rotation position P' is known, finger joint angles θP, θD, and θM may be calculated.

Thus, the controller (not illustrated) may estimate the movement of the finger by using the fingertip rotation position P' and the finger joint angles θP, θD, and θM.

Also, the controller (not illustrated) may control the active unit 20 to convey a desired force to the fingertip without obstructing the movement of the finger. The controller (not illustrated) may control the current of the active unit 20 by using the fingertip rotation position P' and the finger joint angles θP, θD, and θM, thereby changing and conveying the forces generated by various objects such as a hard object and a soft object.

Since the force conveyance system configured as above is mounted on the back of the hand, it may be easy to bend the finger. Also, since the force conveyance system is configured to have 6 degrees of freedom, it may not obstruct movements such as opening/closing of the hand and adduction/abduction of the finger.

MODE OF DISCLOSURE

Figure 11:
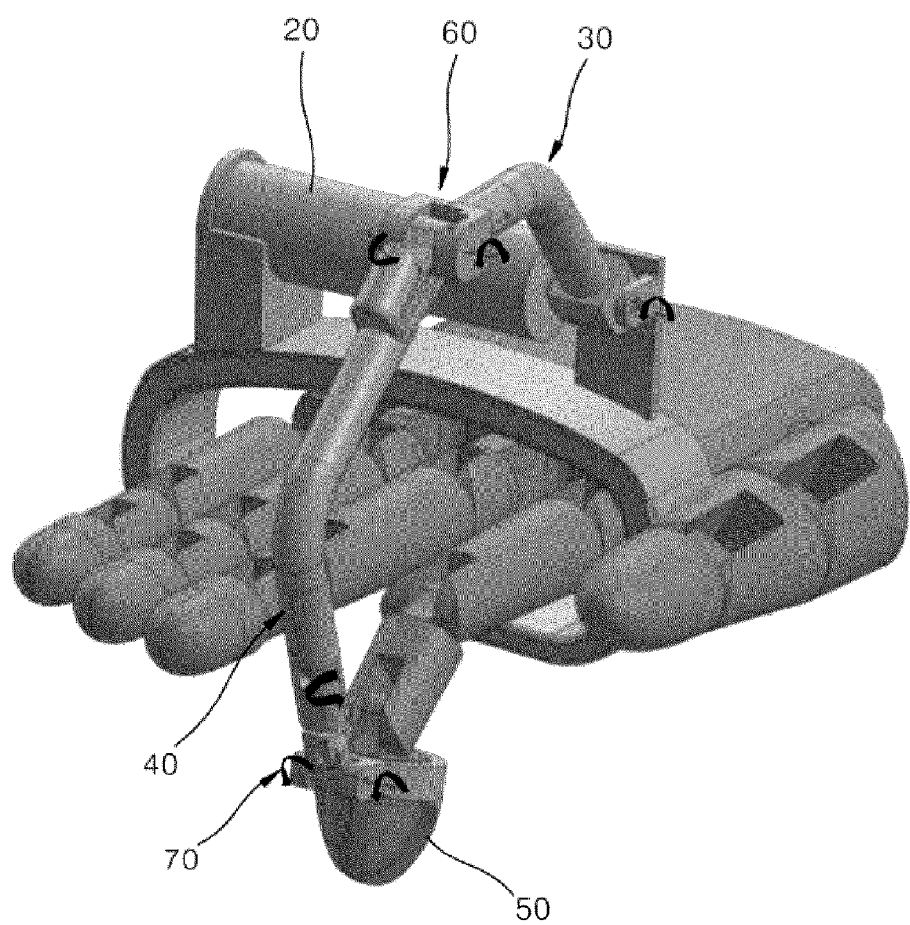
FIG. 11 is a diagram illustrating a force conveyance system according to another embodiment of the present disclosure.

FIG. 11 is a diagram illustrating a force conveyance system according to another embodiment of the present disclosure.

Referring to FIG. 11, a force conveyance system according to another embodiment of the present disclosure is the same as that of the above embodiment in terms of the configuration including an active unit 20, an active link 30, a passive link 40, a finger-wearable unit 50, a first coupler 60, and a second coupler 70 but is different from that of the above embodiment in terms of the shape of the finger-wearable unit 50 and in that the active unit 20 is arranged in a direction perpendicular to the lengthwise direction of the finger. Since the other configurations and operations thereof are similar to those of the above embodiment, redundant descriptions thereof will be omitted for conciseness. Although FIG. 11 illustrates that the active unit is mounted only on the index finger, the present disclosure is not limited thereto and the active unit may be attached to a plurality of other fingers such as the thumb, the index finger, and the middle finger.

Figure 12:
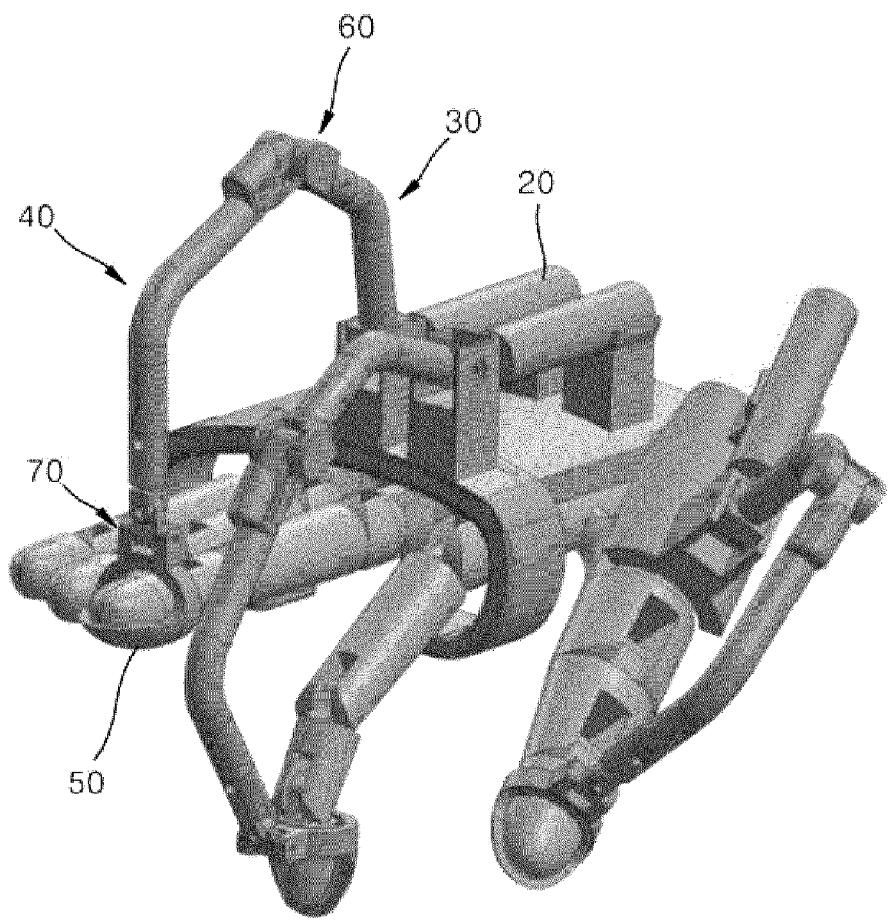
FIG. 12 is a diagram illustrating a force conveyance system according to another embodiment of the present disclosure.

FIG. 12 is a diagram illustrating a force conveyance system according to another embodiment of the present disclosure.

Referring to FIG. 12, a force conveyance system according to another embodiment of the present disclosure is the same as that of the above embodiment in terms of the configuration including an active unit 20, an active link 30, a passive link 40, a finger-wearable unit 50, a first coupler 60, and a second coupler 70 but is different from that of the above embodiment in that the active unit 20 is arranged in the lengthwise direction of the finger. Since the other configurations and operations thereof are similar to those of the above embodiment, redundant descriptions thereof will be omitted for conciseness.

Although the present disclosure has been described with reference to the embodiments illustrated in the drawings, this is merely an example and those of ordinary skill in the art will understand that various modifications and other equivalent embodiments may be derived therefrom. Thus, the spirit and scope of the present disclosure should be defined by the appended claims.

INDUSTRIAL APPLICABILITY

The present disclosure may be applied to a force conveyance system. Although the present disclosure has been described above with reference to example embodiments thereof, those of ordinary skill in the art will understand that various changes in form and details may be made therein without departing from the spirit and scope of the present disclosure as defined by the following claims.

The invention claimed is:

1. A force conveyance system comprising:
a hand-back-wearable unit worn on a back of a hand;
an active unit provided in the hand-back-wearable unit to generate a rotational force;
an active link rotatably coupled to the active unit and rotatable by the rotational force;
a passive link coupled to the active link by a first coupler to have 2 degrees of freedom;
a finger-wearable unit coupled to the passive link by a second coupler to have 3 degrees of freedom and worn on a tip of a finger; and
a controller which estimates a position of the fingertip and an angle of a finger joint and controls the rotational force of the active unit according to the estimation,
wherein the second coupler includes a first rotation unit coupled to the finger-wearable unit and coupled to be rotatable by a movement of the finger around a third rotational axis arranged in an adduction/abduction direction of the finger;
a second rotation unit provided to protrude upward from the first rotation unit and coupled to be rotatable by the movement of the finger around a fourth rotational axis arranged in a lengthwise direction of the finger; and
a third rotation unit configured to couple the second rotation unit and the passive link and coupled to be rotatable by the movement of the finger around a fifth rotational axis arranged in a lengthwise direction of the passive link.

2. The force conveyance system of claim 1, wherein the active link includes:
a first active link unit coupled to the active unit and extending upward from the hand-back-wearable unit; and
a second active link unit inclined at a first preset angle from the first active link unit, formed to be inclined upward, and coupled to the first coupler.

3. The force conveyance system of claim 1, wherein the passive link includes:
a first passive link unit coupled to the second coupler and extending upward from the second coupler; and
a second passive link unit inclined at a second preset angle from the first passive link unit, formed to be inclined upward, and coupled to the first coupler.

4. The force conveyance system of claim 1, wherein the first coupler includes:
one end coupled to the active link and coupled to be rotatable by the rotational force of the active unit around a first rotational axis arranged in an adduction/abduction direction of the finger; and
another end coupled to the passive link and coupled to be rotatable by the movement of the finger around a second rotational axis arranged in a direction perpendicular to the back of the hand.

5. The force conveyance system of claim 1, further comprising an active unit sensor which measures a rotation angle of the active unit.

6. The force conveyance system of claim 5, further comprising a first hole sensor provided at one end of the first coupler, wherein the first hole sensor measures a rotation angle of the active link.

7. The force conveyance system of claim 6, further comprising a second hole sensor provided at another end of the first coupler, wherein the second hole sensor measures a rotation angle of the passive link.

8. The force conveyance system of claim 7, wherein the controller
calculates a tip position of the finger according to the rotation angle of the active unit measured by the active unit sensor, the rotation angle of the active link measured by the first hole sensor, and the rotation angle of the passive link measured by the second hole sensor,
calculates an angle of the finger joint by using the tip position of the finger, and
controls the rotational force of the active unit according to the angle of the finger joint.

9. The force conveyance system of claim 1, wherein the finger-wearable unit includes a finger holder formed in a ring shape to be fitted to the tip of the finger and formed to have one side open.

10. The force conveyance system of claim 9, wherein the finger-wearable unit further includes an opening/closing member configured to open/close an open portion of the finger holder.

11. The force conveyance system of claim 9, wherein an elastic member is provided at an inner circumferential surface of the finger holder.

12. The force conveyance system of claim 1, wherein the active unit is coupled to the hand-back-wearable unit and extending in a direction inclined at a preset angle with respect to a lengthwise direction of the finger.

13. The force conveyance system of claim 12, wherein a rotational axis of the active unit and a rotational axis of the active link are coupled by a bevel gear.

14. A force conveyance system comprising:
- a hand-back-wearable unit worn on a back of a hand;
- an active unit provided in the hand-back-wearable unit to generate a rotational force;
- an active link rotatably coupled to the active unit and rotatable by the rotational force;
- a passive link coupled to the active link by a first coupler to have 2 degrees of freedom;
- a finger-wearable unit coupled to the passive link by a second coupler to have 3 degrees of freedom and worn on a tip of a finger;
- an active unit sensor which measures a rotation angle of the active unit;
- a first hole sensor provided at one end of the first coupler, wherein the first hole sensor measures a rotation angle of the active link;
- a second hole sensor provided at another end of the first coupler, wherein the second hole sensor measures a rotation angle of the passive link; and
- a controller which calculates a tip position of the finger according to the rotation angle of the active unit measured by the active unit sensor, the rotation angle of the active link measured by the first hole sensor, and the rotation angle of the passive link measured by the second hole sensor; calculates an angle of the finger joint by using the tip position of the finger; and controls the rotational force of the active unit according to the angle of the finger joint, wherein the first coupler includes one end coupled to the active link and coupled to be rotatable by the rotational force of the active unit around a first rotational axis arranged in an adduction/abduction direction of the finger and another end coupled to the passive link and coupled to be rotatable by a movement of the finger around a second rotational axis arranged in a direction perpendicular to the back of the hand, and the second coupler includes a first rotation unit coupled to the finger-wearable unit and coupled to be rotatable by the movement of the finger around a third rotational axis arranged in an adduction/abduction direction of the finger, a second rotation unit protruding upward from the first rotation unit and coupled to be rotated by the movement of the finger around a fourth rotational axis arranged in a lengthwise direction of the finger, and a third rotation unit configured to couple the second rotation unit and the passive link and coupled to be rotatable by the movement of the finger around a fifth rotational axis arranged in a lengthwise direction of the passive link.

* * * * *